US011901515B2

(12) United States Patent
Fujita et al.

(10) Patent No.: US 11,901,515 B2
(45) Date of Patent: Feb. 13, 2024

(54) SHEET MATERIAL CONVEYANCE DEVICE

(71) Applicant: Panasonic Corporation, Osaka (JP)

(72) Inventors: Ryo Fujita, Hyogo (JP); Ryuta Abe, Osaka (JP); Masahide Maruyama, Nara (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 323 days.

(21) Appl. No.: 17/477,301

(22) Filed: Sep. 16, 2021

(65) Prior Publication Data

US 2022/0085418 A1   Mar. 17, 2022

(30) Foreign Application Priority Data

Sep. 16, 2020   (JP) .................. 2020-155054

(51) Int. Cl.
*H01M 10/0585* (2010.01)
*B65H 5/12* (2006.01)
*H01M 10/0525* (2010.01)
*B65G 47/84* (2006.01)

(52) U.S. Cl.
CPC ........ *H01M 10/0585* (2013.01); *B65G 47/84* (2013.01); *B65H 5/12* (2013.01); *H01M 10/0525* (2013.01)

(58) Field of Classification Search
None
See application file for complete search history.

(56) References Cited

U.S. PATENT DOCUMENTS 4,578,133 A  *  3/1986  Oshefsky ............... B65H 35/08
                                              156/244.18
11,702,309 B2  *  7/2023  Spurzem .............. B65H 29/241
                                              198/377.02

FOREIGN PATENT DOCUMENTS

JP   2012-106370 A   6/2012
JP   2012-221715 A   11/2012

* cited by examiner

Primary Examiner — William R Harp
(74) Attorney, Agent, or Firm — Rimon, P.C.

(57) ABSTRACT

A sheet material conveyance device includes a plurality of first holding heads each having a curved first holding surface, a first drum holding the plurality of first holding heads, a plurality of second holding heads each having a planar second holding surface, a second drum holding the plurality of second holding heads, a tilt adjustment mechanism structured to adjust a tilt of each second holding surface, and a speed adjustment mechanism structured to adjust a relative movement speed of the first holding head and the second holding head. The first holding head and the second holding head move to a delivery position, and deliver the sheet material between the first holding surface and the second holding surface in a situation in which adjustment is performed by the tilt adjustment mechanism and the speed adjustment mechanism.

7 Claims, 7 Drawing Sheets

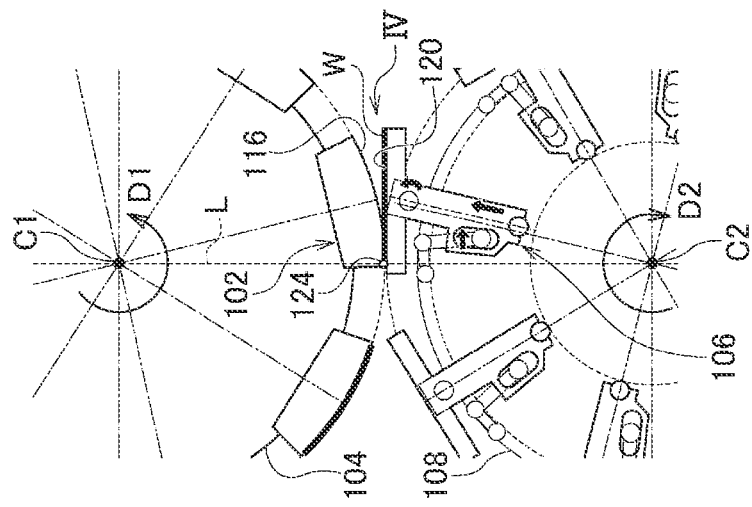
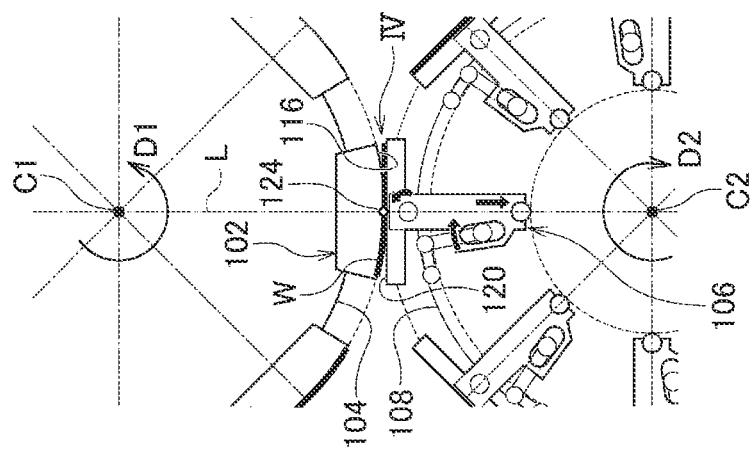
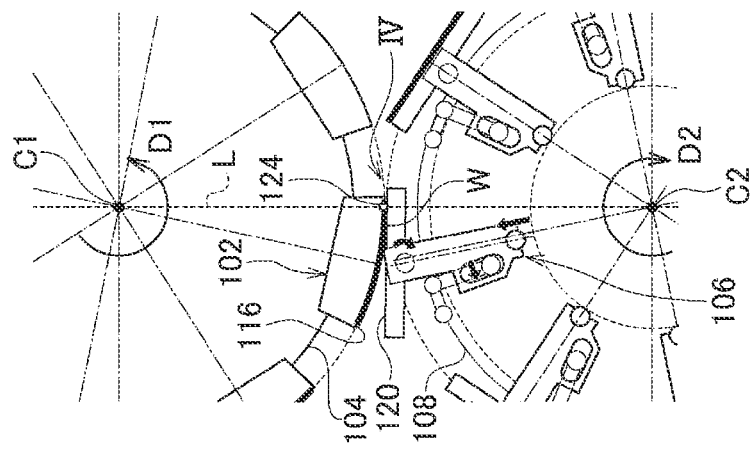

SHEET MATERIAL CONVEYANCE DEVICE

CROSS-REFERENCE TO RELATED APPLICATIONS

This application is based upon and claims the benefit of priority from the prior Japanese Patent Application No. 2020-155054, filed on Sep. 16, 2020, the entire content of each of which is incorporated herein by reference.

BACKGROUND

Field of the Invention

The present disclosure relates to a sheet material conveyance device.

Description of the Related Art

A laminated type battery has been developed as a battery mounted on a vehicle or the like. The battery has a structure in which a laminated electrode member obtained by alternately laminating a plurality of positive plates and a plurality of negative plates via separators, and electrolytic solution are stored in a container (for example, refer to JP 2012-221715 A).

The laminated electrode member can be formed by sequentially conveying unit laminated members each being a sheet material in which several electrode plates and separators are alternately laminated, for example, and laminating the plurality of unit laminated members onto a lamination stage. In the conveyance of unit laminated members, unit laminated members are sometimes exchanged between a holding head having a curved holding surface, and a holding head having a planar holding surface. In this case, due to switching of the holding surface from a curved surface to a planar surface or from the planar surface to the curved surface, load such as shear force might be applied to a unit laminated member. In addition, a sheet material is not limited to a unit laminated member. Also in the conveyance of other sheet materials, the sheet materials are sometimes exchanged between a curved holding surface and a planar holding surface, and load might be applied to these sheet materials at the time of conveyance.

SUMMARY OF THE INVENTION

The present disclosure has been devised in view of such a situation, and one object thereof is to provide a technology of reducing load to be applied to a sheet material when a sheet material is exchanged between a curved holding surface and a planar holding surface.

One aspect of the present disclosure is a sheet material conveyance device. The device includes a plurality of first holding heads each having a curved first holding surface for holding a sheet material, a first drum structured to hold the plurality of first holding heads at predetermined intervals in a circumferential direction in such a manner that each first holding surface faces an external side, and rotate in a first direction to revolve the plurality of first holding heads, a plurality of second holding heads each having a planar second holding surface for holding the sheet material, a second drum structured to hold the plurality of second holding heads at predetermined intervals in a circumferential direction in such a manner that each second holding surface faces an external side, and rotate in a second direction opposite to the first direction to revolve the plurality of second holding heads, a tilt adjustment mechanism structured to adjust a tilt of the second holding surface with respect to a radius direction of the second drum, and a speed adjustment mechanism structured to adjust a relative movement speed of one set of the first holding head and the second holding head that perform exchange of the sheet material. The first holding head and the second holding head, one of which holds the sheet material, and another one of which does not hold the sheet material, move to a delivery position at which the first holding surface and the second holding surface face each other, by rotation of respective drums, and deliver the sheet material between the first holding surface and the second holding surface in a situation in which the tilt and the relative movement speed are adjusted by the tilt adjustment mechanism and the speed adjustment mechanism.

Any combination of the above-described constituent elements, and an aspect obtained by converting a wording in the present disclosure between a method, an apparatus, a system, and the like are also effective as an aspect of the present disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 4A-4C are schematic diagrams for describing an operation of a sheet material conveyance device;

DETAILED DESCRIPTION OF THE INVENTION

Figure 1:
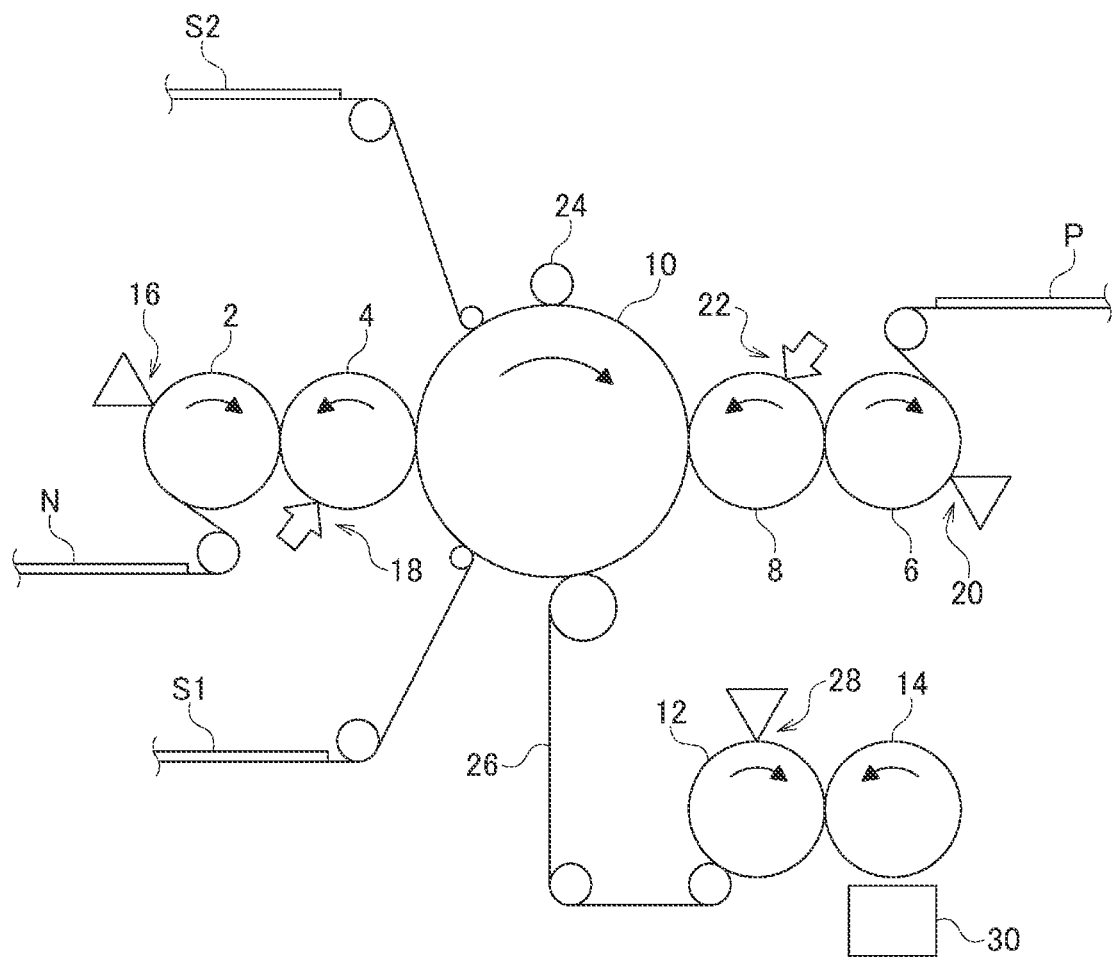
FIG. 1 is a schematic diagram of a laminated electrode member manufacturing device.

Hereinafter, the description will be given on the basis of preferred embodiments of the present disclosure with reference to the drawings. The embodiments are not intended to limit the present disclosure and are exemplifications, and not all features described in the embodiments and a combination thereof are always essential to the present disclosure. The same or equivalent constituent elements, members, and processes illustrated in the drawings are assigned the same reference numerals, and the redundant description will be appropriately omitted. In addition, scale sizes and shapes of members illustrated in the drawings are set in an expedient manner for simplifying the description, and are not to be construed in a limited manner unless otherwise stated.

In addition, in a case where a term such as "first" or "second" is used in this specification and the appended claims, the term does not indicate any order or importance degree unless otherwise stated, and the term is used for distinguishing between a certain configuration and another configuration. In addition, illustration of a part of members unimportant in describing the embodiments is omitted in the drawings.

First Embodiment

FIG. 1 is a schematic diagram of a laminated electrode member manufacturing device 1. As an example, the laminated electrode member manufacturing device 1 is a continuous drum type manufacturing device obtained by combining a plurality of drums. By executing each process such as cutoff, heating, bonding, and lamination of electrode members and separators using drums, it is possible to manufacture laminated electrode members at high speed and continuously. The laminated electrode member is used in a lithium-ion secondary battery, for example.

The laminated electrode member manufacturing device 1 includes a first electrode cutoff drum 2, a first electrode heating drum 4, a second electrode cutoff drum 6, a second electrode heating drum 8, a bonding drum 10, a separator cutoff drum 12, and a lamination drum 14.

The first electrode cutoff drum 2 is a drum that cuts off a continuous member of a plurality of first electrode plates, individuates the continuous member into a plurality of first electrode plates, and conveys the plurality of first electrode plates. In the present embodiment, a first electrode is a negative electrode. A belt-like first electrode continuous member N being a continuous member of a plurality of first electrode plates is supplied to the first electrode cutoff drum 2. The first electrode continuous member N includes a first electrode current collector and a first electrode active material layer. The first electrode active material layer is laminated on the first electrode current collector. In the present embodiment, the first electrode active material layers are laminated on both surfaces of the first electrode current collector, but the first electrode active material layer may be laminated only one surface of the first electrode current collector.

Both of the first electrode current collector and the first electrode active material layer can be formed of known material, and have known structures. The first electrode current collector is formed of foil or porous body containing copper, aluminum, or the like, for example. The first electrode active material layer is formed by applying a first electrode mixture slurry containing first electrode active material, bonding material, dispersant, and the like, for example, onto the surface of the first electrode current collector, and drying and rolling a coated film. The thickness of the first electrode current collector is 3 µm or more and 50 µm or less, for example. The thickness of the first electrode active material layer is 10 µm or more and 100 µm or less, for example.

The first electrode cutoff drum 2 includes a plurality of holding heads arranged in a circumferential direction of the drum, and a cutoff blade for cutting off the first electrode continuous member N. The plurality of holding heads each has a holding surface for holding the first electrode continuous member N in a suction manner. The holding surface of each holding head faces an external side of the first electrode cutoff drum 2. The first electrode continuous member N supplied to the first electrode cutoff drum 2 is conveyed by the rotation of the first electrode cutoff drum 2 in a state of being held by the holding surfaces of the plurality of holding heads in a suction manner.

The plurality of holding heads each rotates about a central axis of the first electrode cutoff drum 2, and can move in the circumferential direction of the drum independently of other holding heads. A relative movement of holding heads is realized by mounting a motor different from a motor that rotates the first electrode cutoff drum 2, on each holding head. By the independent driving of holding heads, the adjustment of a cutoff position of the first electrode continuous member N to be cut off by the cutoff blade, the position adjustment of an individuated first electrode plate, and the like are enabled.

The first electrode cutoff drum 2 rotates and conveys the supplied first electrode continuous member N while holding the first electrode continuous member N in a suction manner, and cuts off the first electrode continuous member N at a cutoff position 16 schematically illustrated in FIG. 1. The first electrode continuous member N is cut off by the cutoff blade at a position between neighboring holding heads, and individuated into a plurality of first electrode plates. Each of the obtained first electrode plates is conveyed in a state of being held by a corresponding holding head in a suction manner. The positions of the plurality of generated first electrode plates are monitored by a camera or the like.

The first electrode heating drum 4 is arranged in proximity to the first electrode cutoff drum 2. The holding heads of the first electrode cutoff drum 2 temporarily accelerate or decelerate up to substantially the same speed as a linear speed of the first electrode heating drum 4, in front of a proximate position with the first electrode heating drum 4. A relative speed between the holding heads and the first electrode heating drum 4 thereby becomes substantially zero. The holding head discharges a first electrode plate held in a suction manner, to the first electrode heating drum 4 side at a timing at which the relative speed becomes substantially zero.

The first electrode heating drum 4 rotates, while holding the first electrode plate discharged from the first electrode cutoff drum 2 in a suction manner, and preliminary heats the first electrode plate using a built-in heater. The preliminary heating is executed for thermally boding a separator and the first electrode plate in a subsequent bonding process. In the present embodiment, the first electrode plate is heated at a heating position 18, but a heating position is not limited to this. For example, the first electrode plate may be heated in the entire region in the circumferential direction of the first electrode heating drum 4.

The second electrode cutoff drum 6 is a drum that cuts off a continuous member of a plurality of second electrode plates, individuates the continuous member into a plurality of second electrode plates, and conveys the plurality of second electrode plates. In the present embodiment, a second electrode is a positive electrode. A belt-like second electrode continuous member P being a continuous member of a plurality of second electrode plates is supplied to the second electrode cutoff drum 6. The second electrode continuous member P includes a second electrode current collector and a second electrode active material layer. The second electrode active material layer is laminated on the second electrode current collector. In the present embodiment, the second electrode active material layers are laminated on both surfaces of the second electrode current collector, but the second electrode active material layer may be laminated only one surface of the second electrode current collector.

Both of the second electrode current collector and the second electrode active material layer can be formed of known material, and have known structures. The second electrode current collector is formed of foil or porous body containing stainless steel, aluminum, or the like, for example. The second electrode active material layer is formed by applying a second electrode mixture slurry containing second electrode active material, bonding material, dispersant, and the like, for example, onto the surface of the second electrode current collector, and drying and rolling a coated film. The thickness of the second electrode current collector is 3 µm or more and 50 µm or less, for example. The thickness of the second electrode active material layer is 10 µm or more and 100 µm or less, for example.

The second electrode cutoff drum 6 includes a plurality of holding heads arranged in a circumferential direction of the drum, and a cutoff blade for cutting off the second electrode continuous member P. The plurality of holding heads each has a holding surface for holding the second electrode continuous member P in a suction manner. The holding surface of each holding head faces an external side of the second electrode cutoff drum 6. The second electrode continuous member P supplied to the second electrode cutoff drum 6 is conveyed by the rotation of the second electrode cutoff drum 6 in a state of being held by the holding surfaces of the plurality of holding heads in a suction manner.

The plurality of holding heads each rotates about a central axis of the second electrode cutoff drum 6, and can move in the circumferential direction of the drum independently of other holding heads. A relative movement of holding heads is realized by mounting a motor different from a motor that rotates the second electrode cutoff drum 6, on each holding head. By the independent driving of holding heads, the adjustment of a cutoff position of the second electrode continuous member P to be cut off by the cutoff blade, the position adjustment of an individuated second electrode plate, and the like are enabled.

The second electrode cutoff drum 6 rotates and conveys the supplied second electrode continuous member P while holding the second electrode continuous member P in a suction manner, and cuts off the second electrode continuous member P at a cutoff position 20 schematically illustrated in FIG. 1. The second electrode continuous member P is cut off by the cutoff blade at a position between neighboring holding heads, and individuated into a plurality of second electrode plates. Each of the obtained second electrode plates is conveyed in a state of being held by a corresponding holding head in a suction manner. The positions of the plurality of generated second electrode plates are monitored by a camera or the like.

The second electrode heating drum 8 is arranged in proximity to the second electrode cutoff drum 6. The holding heads of the second electrode cutoff drum 6 temporarily accelerate or decelerate up to substantially the same speed as a linear speed of the second electrode heating drum 8, in front of a proximate position with the second electrode heating drum 8. A relative speed between the holding heads and the second electrode heating drum 8 thereby becomes substantially zero. The holding head discharges a second electrode plate held in a suction manner, to the second electrode heating drum 8 side at a timing at which the relative speed becomes substantially zero.

The second electrode heating drum 8 rotates, while holding the second electrode plate discharged from the second electrode cutoff drum 6 in a suction manner, and preliminary heats the second electrode plate using a built-in heater. The preliminary heating is executed for thermally boding a separator and the second electrode plate in a subsequent bonding process. In the present embodiment, the second electrode plate is heated at a heating position 22, but a heating position is not limited to this. For example, the second electrode plate may be heated in the entire region in the circumferential direction of the second electrode heating drum 8.

The bonding drum 10 is a drum that forms a continuous lamination member 26 in which a plurality of unit laminated members is continuously provided. Each unit laminated member includes a first separator, a first electrode plate, a second separator, and a second electrode plate. A belt-like first separator continuous member S1 in which a plurality of first separators is continuously provided, and a belt-like second separator continuous member S2 in which a plurality of second separators is continuously provided are supplied to the bonding drum 10. Thermal bonding layers are provided on the respective surfaces of the first separator continuous member S1 and the second separator continuous member S2. The thermal bonding layer has a property of not expressing adhesiveness at room temperature, but expressing adhesiveness due to heating. For example, the thermal bonding layer is a thermoplastic layer containing a thermoplastic polymer, and expresses adhesiveness on the basis of plastic deformation of the thermoplastic polymer that is caused by heating.

In addition, the bonding drum 10 is arranged in proximity to the first electrode heating drum 4 and the second electrode heating drum 8. Then, the plurality of first electrode plates is supplied to the bonding drum 10 from the first electrode cutoff drum 2 via the first electrode heating drum 4, and the plurality of second electrode plates is supplied to the bonding drum 10 from the second electrode cutoff drum 6 via the second electrode heating drum 8. The first electrode plates are rotated and conveyed while being preliminarily heated by the first electrode heating drum 4, and discharged to the bonding drum 10 side at a proximate position between the first electrode heating drum 4 and the bonding drum 10. The second electrode plates are rotated and conveyed while being preliminarily heated by the second electrode heating drum 8, and discharged to the bonding drum 10 side at a proximate position between the second electrode heating drum 8 and the bonding drum 10.

Supply positions of the first separator continuous member S1, the first electrode plates, the second separator continuous member S2, and the second electrode plates to the bonding drum 10 are arranged in this order from an upstream side in a rotational direction of the bonding drum 10. Accordingly, the first separator continuous member S1 is initially supplied to the bonding drum 10 at a predetermined position. The first separator continuous member S1 is rotated and conveyed while being held by the bonding drum 10 in a suction manner. Subsequently, on the downstream side of the supply position of the first separator continuous member S1, the first electrode plates are supplied from the first electrode heating drum 4 to the bonding drum 10 and placed onto the first separator continuous member S1. The plurality of first electrode plates is arrayed on the first separator continuous member S1 at predetermined intervals in a conveyance direction of the first separator continuous member S1.

Subsequently, on the downstream side of the supply position of the first electrode plates, the second separator continuous member S2 is supplied to the bonding drum 10 and placed onto the plurality of first electrode plates. Subsequently, on the downstream side of the supply position of the second separator continuous member S2, the first separator continuous member S1, the plurality of first electrode plates, and the second separator continuous member S2 are pressed by a thermocompression roller 24, and these are bonded to each other. Subsequently, on the downstream side of a thermocompression position of the thermocompression roller 24, the second electrode plates are supplied from the second electrode heating drum 8 to the bonding drum 10 and placed onto the second separator continuous member S2. The plurality of second electrode plates is arrayed on the second separator continuous member S2 at predetermined intervals in a conveyance direction of the second separator continuous member S2. In addition, by pressing force of the second electrode heating drum 8, the plurality of second electrode plates is bonded to the second separator continuous member S2.

By the above processes, the first separator continuous member S1, the plurality of first electrode plates, the second separator continuous member S2, and the plurality of second electrode plates are laminated in this order and bonded, and the continuous lamination member 26 is formed. The continuous lamination member 26 has a structure in which unit laminated members each including a first separator, a first electrode plate, a second separator, and a second electrode plate are continuously provided by being connected by the first separator continuous member S1 and the second separator continuous member S2. The continuous lamination member 26 is conveyed from the bonding drum 10 to the separator cutoff drum 12. Note that a unit laminated member having a three-layer structure not including a second electrode plate may be generated every predetermined number of unit laminated members, by a second electrode plate not being supplied from the second electrode cutoff drum 6 side. In addition, an electrode plate not to be supplied may be a first electrode plate.

The separator cutoff drum 12 is a drum that cuts off the first separator continuous member S1 and the second separator continuous member S2 of the continuous lamination member 26 and individuates the continuous lamination member 26 into a plurality of unit laminated members. The separator cutoff drum 12 includes a plurality of holding heads arranged in a circumferential direction of the drum, and a cutoff blade that cuts off the continuous lamination member 26. The plurality of holding heads each has a holding surface for holding the continuous lamination member 26 in a suction manner. The holding surface of each holding head faces an external side of the separator cutoff drum 12. The continuous lamination member 26 supplied to the separator cutoff drum 12 is conveyed by the rotation of the separator cutoff drum 12 in a state of being held by the holding surfaces of the plurality of holding heads in a suction manner.

The plurality of holding heads each rotates about a central axis of the separator cutoff drum 12, and can move in the circumferential direction of the drum independently of other holding heads. A relative movement of holding heads is realized by mounting a motor different from a motor that rotates the separator cutoff drum 12, on each holding head. By the independent driving of holding heads, the adjustment of a cutoff position of the continuous lamination member 26 to be cut off by the cutoff blade, the position adjustment of an individuated unit laminated member, and the like are enabled.

The separator cutoff drum 12 cuts off the continuous lamination member 26 at a cutoff position 28 schematically illustrated in FIG. 1. The continuous lamination member 26 is cut off at a position between neighboring holding heads, and individuated into a plurality of unit laminated members. At this time, the first separator continuous member S1 and the second separator continuous member S2 of the continuous lamination member 26 are cut off between neighboring electrode plates in the conveyance direction of the continuous lamination member 26. Each of the obtained unit laminated members is conveyed in a state of being held by a corresponding holding head in a suction manner. The holding head discharges a unit laminated member held in a suction manner, to the lamination drum 14 side. The positions of the plurality of generated unit laminated members are monitored by a camera or the like.

The lamination drum 14 is a drum that laminates a plurality of unit laminated members onto a lamination stage 30 and forms a laminated electrode member. The lamination drum 14 includes a plurality of lamination heads arranged in a circumferential direction of the drum. Each lamination head has a holding surface for holding a unit laminated member in a suction manner. The holding surface of each lamination head faces an external side of the lamination drum 14. The plurality of lamination heads each rotates about a central axis of the lamination drum 14, and sequentially progresses to a lamination position facing the lamination stage 30. A lamination head that has reached the lamination position discharges a held unit laminated member to the lamination stage 30.

The lamination stage 30 is arranged immediately below the lamination drum 14. Unit laminated members discharged from the respective lamination heads of the lamination drum 14 are sequentially laminated onto the lamination stage 30. A laminated electrode member is thereby formed. The lamination stage 30 can be driven in an X-axis direction and a Y-axis direction orthogonal to each other. In addition, the lamination stage 30 can be adjusted in a tilt angle on an X-Y plane. With this configuration, positions in the X-axis direction and the Y-axis direction, and a tilt angle of a unit laminated member discharged from the lamination drum 14, with respect to unit laminated members already laminated on the lamination stage 30 are adjusted.

Figure 2:
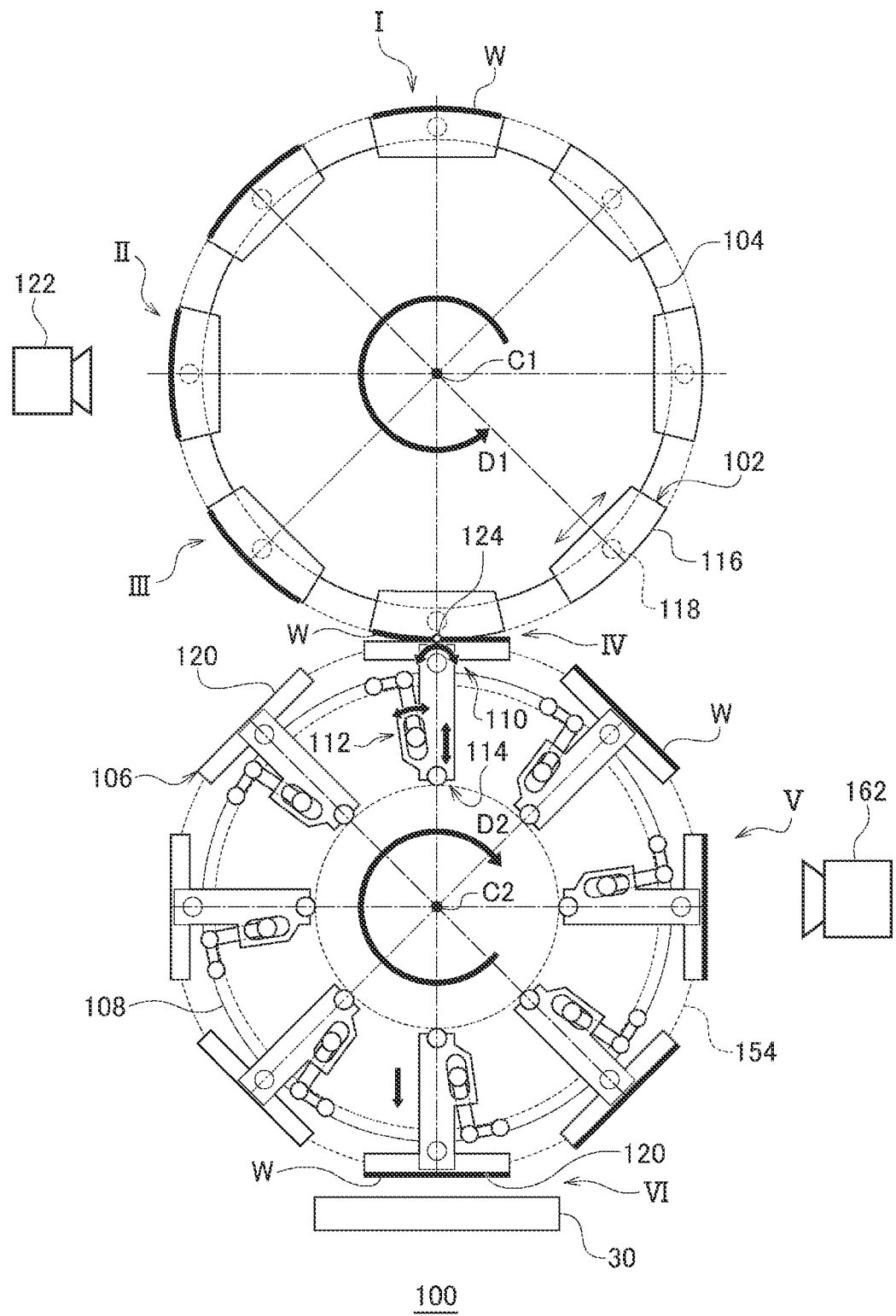
FIG. 2 is a schematic diagram of a sheet material conveyance device according to a first embodiment.

The separator cutoff drum 12 and the lamination drum 14 are formed by a sheet material conveyance device 100 according to the present embodiment. FIG. 2 is a schematic diagram of the sheet material conveyance device 100 according to the first embodiment. Note that, in FIG. 2, illustration of each cam and a guide rail 158 provided on a fixed plate 154 is omitted.

The sheet material conveyance device 100 includes a plurality of first holding heads 102, a first drum 104, a plurality of second holding heads 106, a second drum 108, a tilt adjustment mechanism 110, a speed adjustment mechanism 112, and a radius position adjustment mechanism 114. The first drum 104 corresponds to the separator cutoff drum 12, and the plurality of first holding head 102 corresponds to the plurality of holding heads included in the separator cutoff drum 12. In addition, the second drum 108 corresponds to the lamination drum 14, and the plurality of second holding heads 106 corresponds to the plurality of lamination heads. Accordingly, in the present embodiment, the first holding head 102 is a delivery head and the second holding head 106 is a receiving head. Note that the separator cutoff drum 12 and the lamination drum 14 are arranged side by side in FIG. 1, and the first drum 104 and the second drum 108 are arranged in tandem in FIG. 2, but the one skilled in the art can naturally understand that a positional relationship between these two drums can be appropriately changed.

Each of the first holding heads 102 has a first holding surface 116 for holding a sheet material W. For example, each of the first holding surfaces 116 includes a suction mechanism (not illustrated) such as a vacuum valve that sucks in atmosphere gas such as air, and holds the sheet material W in a suction manner using the suction mechanism. The first holding surfaces 116 respectively include a plurality of suction holes arranged in the circumferential direction of the first drum 104. A start and a stop of suction of atmosphere gas in each suction hole can be independently switched. As an example, the sheet material W of the present embodiment is a unit laminated member in which one or two electrode plates and two separators are laminated. In other words, the sheet material W includes electrode plates and separators of a battery. Note that FIG. 2 illustrates eight first holding heads 102, but the number of first holding heads 102 is not limited.

The plurality of first holding heads 102 is held by the first drum 104. The first drum 104 is a cylindrical drum, and holds the plurality of first holding heads 102 at predetermined intervals in the circumferential direction in such a manner that the first holding surfaces 116 face an external side of the cylinder. A drive mechanism (not illustrated) such as a motor is coupled to a rotational center C1 of the first drum 104. The first drum 104 thereby rotates in a first direction D1 to revolve the plurality of first holding heads 102. In the present embodiment, the first direction D1 is a counterclockwise direction as an example.

Each of the first holding surfaces 116 has a curved surface shape. For example, all of the first holding surfaces 116 exist in a spread manner at equidistant positions from the rotational center C1 of the first drum 104. Accordingly, if the first holding heads 102 move in the circumferential direction due to the rotation of the first drum 104, the respective first holding surfaces 116 move on the same cylinder surface.

Each of the first holding heads 102 includes a drive unit 118, and can move in the circumferential direction of the first drum 104 independently of other first holding heads 102. The drive unit 118 is formed by a known stepping motor or the like, for example. In other words, each of the first holding heads 102 can move in the circumferential direction of the first drum 104 separately from the movement caused by the rotation of the first drum 104. The first holding heads 102 can thereby displace the first holding surfaces 116 backward and forward in the rotational direction with respect to the rotation of the first drum 104.

Each of the second holding heads 106 has a second holding surface 120 for holding the sheet material W. For example, each of the second holding surfaces 120 includes a suction mechanism (not illustrated) that sucks in atmosphere gas such as air, and holds the sheet material W in a suction manner using the suction mechanism. The second holding surfaces 120 respectively include a plurality of suction holes arranged in a circumferential direction of the second drum 108. A start and a stop of suction of atmosphere gas in each suction hole can be independently switched. Note that FIG. 2 illustrates eight second holding heads 106, but the number of second holding heads 106 is not limited.

The plurality of second holding heads 106 is held by the second drum 108. The second drum 108 is a cylindrical drum, and holds the plurality of second holding heads 106 at predetermined intervals in the circumferential direction in such a manner that the second holding surfaces 120 face an external side of the cylinder. A drive mechanism (not illustrated) such as a motor is coupled to a rotational center C2 of the second drum 108. The second drum 108 thereby rotates in a second direction D2 opposite to the first direction D1 to revolve the plurality of second holding heads 106. In the present embodiment, the second direction D2 is a clockwise direction as an example. In addition, as an example, the first drum 104 and the second drum 108 rotate at the same speed.

Each of the second holding surfaces 120 has a planar shape. The second holding heads 106 of the present embodiment discharge the sheet materials W to the lamination stage 30 having a planar shape, and laminate the sheet materials W on the lamination stage 30. Thus, it is preferable that the second holding surface 120 has a planar shape.

The second drum 108 is arranged in proximity to the first drum 104. A delivery position IV at which the first holding surface 116 and the second holding surface 120 face each other is thereby formed at predetermined positions on the respective circumferences of the first drum 104 and the second drum 108. The first holding heads 102 holding the sheet materials W, and the second holding heads 106 not holding the sheet material W sequentially move to the delivery position IV by the rotation of each drum.

Specifically, each of the first holding heads 102 holds the individuated sheet material W in a suction manner at a circumferential position I of the first drum 104. In addition, a camera 122 is arranged at a circumferential position II on the downstream side of the circumferential position I in the first direction D1. A state of the sheet material W and a position on the first holding surface 116 of the sheet material W are detected by the camera 122. Then, the drive unit 118 performs driving in accordance with a detection result of the camera 122 at a circumferential position III on the downstream side of the circumferential position II in the first direction D1. Each of the first holding heads 102 thereby moves forward or backward with respect to the rotation of the first drum 104 in accordance with a position of the sheet material W on the first holding surface 116. Consequently, a position of the first holding surface 116 with respect to the second holding surface 120 to be faced at the delivery position IV is corrected.

Each of the first holding heads 102 holding the sheet material W reaches the delivery position IV existing on the downstream side of the circumferential position III in the first direction D1. In addition, by the rotation of the second drum 108, the second holding head 106 not holding the sheet material W also reaches the delivery position IV. Then, at the delivery position IV, the sheet material W is delivered from the first holding surface 116 to the second holding surface 120.

Because the first holding surface 116 has a curved surface shape and the second holding surface 120 has a planar shape, portions most proximate to each other are locally formed on the respective surfaces of the first holding surface 116 and the second holding surface 120 facing each other. A delivery point, or transfer point 124 of the sheet material W is formed in the portions most proximate to each other. Strictly, the delivery point 124 is a straight line parallel to an axial center direction of each drum. Along with the progress of the first holding head 102, the delivery point 124 moves on the first holding surface 116 from the front to the back in the moving direction of the first holding head 102. In addition, along with the progress of the second holding head 106, the delivery point 124 moves on the second holding surface 120 from the front to the back in the moving direction of the second holding head 106.

The suction holes of the first holding surfaces 116 release (suction release) the suction of the sheet materials W in order from suction holes that have passed through the delivery point 124. On the other hand, the suction holes of the second holding surfaces 120 start the suction of the sheet materials W in order from suction holes that have passed through the delivery point 124. The sheet materials W held by the first holding surface 116 are thereby delivered to the second holding surfaces 120 in order from portions that have passed through the delivery point 124. Note that, actually, there is a time lag from when the suction mechanism is driven to when suction force (vacuum pressure) is generated in a suction hole. Thus, a suction mechanism corresponding to each suction hole is driven a predetermined time before each suction hole passes through the delivery point 124, in such a manner that suction force is generated in the suction hole of the second holding surface 120 at a time point at which the suction hole passes through the delivery point 124.

Figure 3:
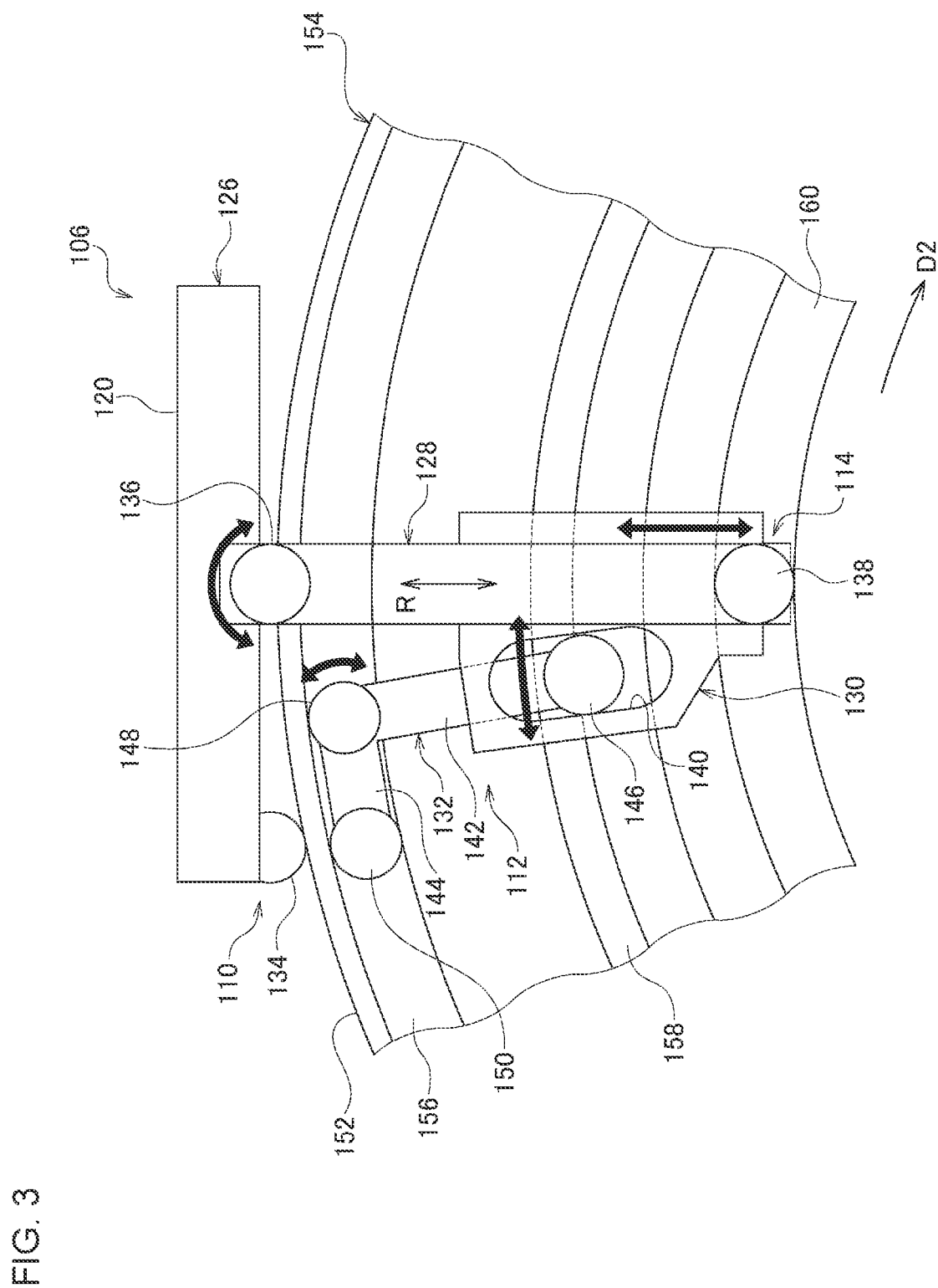
FIG. 3 is a schematic diagram of a second holding head, a tilt adjustment mechanism, a speed adjustment mechanism, and a radius position adjustment mechanism.

In a case where the sheet material W is delivered from the first holding surface 116 to the second holding surface 120 while maintaining the rotation of the first drum 104 and the second drum 108, when the sheet material W moves from the curved surface to the planar surface, load such as shear force might be applied to the sheet material W. In consideration of this, the sheet material conveyance device 100 of the present embodiment reduces load to be applied to the sheet material W, using the tilt adjustment mechanism 110, the speed adjustment mechanism 112, and the radius position adjustment mechanism 114. FIG. 3 is a schematic diagram of the second holding head 106, the tilt adjustment mechanism 110, the speed adjustment mechanism 112, and the radius position adjustment mechanism 114.

The second holding head 106 includes a head portion 126, a head support portion 128, a base plate 130, and a link portion 132. The head portion 126 has a substantially flat plate shape, and a principal surface facing a radius direction R external side of the second drum 108 forms the second holding surface 120. A first cam follower 134 is provided on a principal surface of the head portion 126 that faces a radius direction R internal side. As an example, the first cam follower 134 is provided at a back end in the moving direction of the second holding head 106.

The head support portion 128 has a substantially stick shape, and extends in a radius direction R of the second drum 108. An end portion of the head support portion 128 that is positioned on the radius direction R external side is coupled to the head portion 126 via a pivot shaft, or pitch axis shaft 136. The head portion 126 is rotatable about the pivot shaft 136, and can thereby change a tilt of the second holding surface 120 with respect to the radius direction R. A second cam follower 138 is provided at an end portion of the head support portion 128 that is positioned on the radius direction R internal side.

The base plate 130 holds the head support portion 128 in such a manner as to be slidable in the radius direction R. The base plate 130 includes an elongate hole 140 extending approximately in the radius direction R. The link portion 132 is a member having a substantially L shape, and includes a first portion 142 extending approximately in the radius direction R, and a second portion 144 extending substantially orthogonally from an end portion of the first portion 142 on the radius direction R external side. An end portion of the first portion 142 on the radius direction R internal side is coupled to the elongate hole 140 via a third cam follower 146. With this configuration, a displacement in the radius direction R of the third cam follower 146 that is caused by the link portion 132 rotating about a link shaft 148 can be allowed by an amount corresponding to the length of the elongate hole 140.

The link shaft 148 is provided at an intersection point (corner portion of an L shape) of the first portion 142 and the second portion 144. The link shaft 148 is coupled to the second drum 108, and follows the rotation of the second drum 108. The link portion 132, the base plate 130, the head support portion 128, and the head portion 126 are coupled to the second drum 108 via the link shaft 148. Accordingly, by the link shaft 148 following the rotation of the second drum 108, the link portion 132, the base plate 130, the head support portion 128, and the head portion 126 move in the circumferential direction of the second drum 108 in synchronization with the rotation. A fourth cam follower 150 is provided at a leading end of the second portion 144.

The tilt adjustment mechanism 110 is a mechanism that adjusts a tilt of the second holding surface 120 with respect to the radius direction R of the second drum 108. By the tilt adjustment mechanism 110 adjusting the tilt of the second holding surface 120, a tilt of a normal line of the second holding surface 120 changes with respect to the radius direction R. The tilt adjustment mechanism 110 of the present embodiment is formed by a cam mechanism including a first cam 152 and the first cam follower 134.

The fixed plate 154 that has a circular shape and does not follow the rotation of the second drum 108 is provided on the second drum 108. The first cam 152 is provided on the fixed plate 154. The fixed plate 154 is arranged in such a manner that its center overlaps the rotational center C2 of the second drum 108. The first cam 152 extends in the circumferential direction of the fixed plate 154. As an example, the first cam 152 is provided on an outer circumference end surface of the fixed plate 154. The first cam follower 134 slidably contacts the first cam 152, and moves along the first cam 152 in accordance with the rotation of the second drum 108.

The first cam 152 has a shape that is based on a concentric circle with the second drum 108. Nevertheless, a portion of the first cam 152 that extends in a region including the delivery position IV is shifted with respect to a basic circle in such a manner that the tilt of the second holding surface 120 changes. The region including the delivery position IV includes, for example, a predetermined region contacting the delivery position IV on a moving direction backward side of the second holding head 106 (in other words, a region through which the second holding head 106 passes immediately before reaching the delivery position IV), and the delivery position IV.

For example, in a case where the first cam 152 is curved in a direction getting away from a circle center with respect to the basic circle, the first cam follower 134 passing through this portion is displaced toward the radius direction R external side of the second drum 108. The second holding surface 120 thereby rotates about the pivot shaft 136, and a front end side in a traveling direction of the second holding head 106 is displaced toward the radius direction R internal side. Accordingly, the second holding surface 120 can be anteverted. On the other hand, in a case where the first cam 152 is curved in a direction getting closer to a circle center with respect to the basic circle, the first cam follower 134 passing through this portion is displaced toward the radius direction R internal side of the second drum 108. The second holding surface 120 thereby rotates about the pivot shaft 136, and a front end side in a traveling direction of the second holding head 106 is displaced toward the radius direction R external side. Accordingly, the second holding surface 120 can be retroverted. Note that the orientation of the second holding surface 120 that is set when the first cam follower 134 exists on the basic circle of the first cam 152, that is to say, the orientation of the second holding surface 120 in which a normal line of the second holding surface 120 becomes parallel to the radius direction R is regarded as a reference tilt orientation.

The speed adjustment mechanism 112 is a mechanism that adjusts a relative movement speed of one set of the first holding head 102 and the second holding head 106 that exchange the sheet material W. The speed adjustment mechanism 112 of the present embodiment sets a moving speed of the first holding heads 102 to a constant speed over the entire circumference of the first drum 104. On the other hand, moving speeds of the second holding heads 106 in the predetermined region contacting the delivery position IV on the moving direction backward side, and at the delivery position IV are differentiated from a moving speed in other regions. At the delivery position IV, a relative movement speed of the first holding head 102 and the second holding head 106 is thereby adjusted.

The speed adjustment mechanism 112 of the present embodiment is formed by a cam mechanism including a second cam 156 and the fourth cam follower 150. The second cam 156 is provided on the fixed plate 154. The second cam 156 extends in the circumferential direction of the fixed plate 154. As an example, the second cam 156 is a groove cam provided on a principal surface of the fixed plate 154. The fourth cam follower 150 slidably contacts the second cam 156, and moves along the second cam 156 in accordance with the rotation of the second drum 108.

The second cam 156 has a shape that is based on a concentric circle with the second drum 108. Nevertheless, a portion of the second cam 156 that extends in the region including the delivery position IV is shifted with respect to a basic circle in such a manner that a relative movement speed of the first holding head 102 and the second holding head 106 is adjusted.

For example, in a case where the second cam 156 is curved in a direction getting away from a circle center with respect to the basic circle, the fourth cam follower 150 passing through this portion is displaced toward the radius direction R external side of the second drum 108. The link portion 132 thereby rotates about the link shaft 148 in the second direction D2, and the third cam follower 146 is displaced in an opposite direction of the moving direction of the second holding head 106. The base plate 130 is slidably fitted in the guide rail 158 provided on the fixed plate 154. The guide rail 158 has a shape that is based on a concentric circle with the second drum 108. Thus, the base plate 130 slides on the guide rail 158 in the opposite direction of the moving direction of the second holding head 106 (is displaced backward in the moving direction) in accordance with the displacement of the third cam follower 146. A moving speed of the second holding head 106 thereby decreases.

On the other hand, in a case where the second cam 156 is curved in a direction getting closer to a circle center with respect to the basic circle, the fourth cam follower 150 passing through this portion is displaced toward the radius direction R internal side of the second drum 108. The link portion 132 thereby rotates about the link shaft 148 in the opposite direction (the first direction D1) of the second direction D2, and the third cam follower 146 is displaced in the moving direction of the second holding head 106. The base plate 130 slides on the guide rail 158 in the moving direction of the second holding head 106 (is displaced forward in the moving direction) in accordance with the displacement of the third cam follower 146. A moving speed of the second holding head 106 thereby increases. Note that a moving speed of the second holding head 106 that is set when the fourth cam follower 150 exists on the basic circle of the second cam 156, that is to say, a moving speed attributed only to the rotation of the second drum 108 is regarded as a reference moving speed. In addition, an anteroposterior position in the moving direction of the second holding head 106 not accelerated or decelerated by the speed adjustment mechanism 112 is regarded as a reference anteroposterior position.

The radius position adjustment mechanism 114 is a mechanism that adjusts a position of each of the second holding surfaces 120 in the radius direction R of the second drum 108. The radius position adjustment mechanism 114 of the present embodiment is formed by a cam mechanism including a third cam 160 and the second cam follower 138. The third cam 160 is provided on the fixed plate 154. The third cam 160 extends in the circumferential direction of the fixed plate 154. As an example, the third cam 160 is a groove cam provided on the principal surface of the fixed plate 154. The second cam follower 138 slidably contacts the third cam 160, and moves along the third cam 160 in accordance with the rotation of the second drum 108.

The third cam 160 has a shape that is based on a concentric circle with the second drum 108. Nevertheless, a portion of the third cam 160 that extends in the region including the delivery position IV is shifted with respect to the basic circle in such a manner that a radius direction position of the second holding surface 120 changes.

For example, in a case where the third cam 160 is curved in a direction getting away from a circle center with respect to the basic circle, the second cam follower 138 passing through this portion is displaced toward the radius direction R external side of the second drum 108. The head support portion 128 thereby slides toward the radius direction R external side, and the second holding surface 120 gets closer to the first holding surface 116. On the other hand, in a case where the third cam 160 is curved in a direction getting closer to a circle center with respect to the basic circle, the second cam follower 138 passing through this portion is displaced toward the radius direction R internal side of the second drum 108. The head support portion 128 thereby slides toward the radius direction R internal side, and the second holding surface 120 gets away from the first holding surface 116. Note that a position of the second holding surface 120 that is set when the second cam follower 138 exists on the basic circle of the third cam 160 is regarded as a reference radius direction position.

The first holding head 102 and the second holding head 106 that have reached the delivery position IV deliver the sheet material W from the first holding surface 116 to the second holding surface 120 in a situation in which a tilt of the second holding surface 120, a relative movement speed of the first holding surface 116 and the second holding surface 120, and a radius direction position of the second holding surface 120 are adjusted by the tilt adjustment mechanism 110, the speed adjustment mechanism 112, and the radius position adjustment mechanism 114.

FIGS. 4A to 4C are schematic diagrams for describing an operation of the sheet material conveyance device 100. Note that, in FIGS. 4A to 4C, illustration of each cam and the guide rail 158 is omitted. The tilt adjustment mechanism 110, the speed adjustment mechanism 112, and the radius position adjustment mechanism 114 of the present embodiment adjust a tilt of the second holding surface 120, a relative movement speed of the first holding surface 116 and the second holding surface 120, and a radius direction position of the second holding surface 120 in such a manner that a position of the delivery point 124 is fixed with respect to the rotational centers C1 and C2 of the respective drums, and a relative movement speed of the first holding head 102 and the second holding head 106 at the delivery point 124 gets closer to zero.

Specifically, by cooperation between the tilt adjustment mechanism 110, the speed adjustment mechanism 112, and the radius position adjustment mechanism 114, the second holding surface 120 moves at a constant speed and parallel to a tangent line of the first holding surface 116 at the delivery point 124. Accordingly, an angle of the second holding surface 120 with respect to the first holding surface 116 is kept constant at the delivery point 124. In addition, the second holding surface 120 linearly moves. The position of the delivery point 124 can be thereby fixed with respect to the rotational center C1 of the first drum 104 and the rotational center C2 of the second drum 108. As an example, the position of the delivery point 124 is fixed on the same straight line L as the rotational center C1 of the first drum 104 and the rotational center C2 of the second drum 108. In addition, a relative movement speed of the first holding surface 116 and the second holding surface 120 at the delivery point 124 is brought closer to zero. As an example, the relative movement speed is set to substantially zero until the delivery of the sheet material W is completed.

First of all, as illustrated in FIG. 4A, the second holding surface 120 is anteverted to be anterior to the reference tilt orientation, by the function of the tilt adjustment mechanism 110. In addition, the second holding surface 120 is decelerated to a moving speed lower than the reference moving speed, by the function of the speed adjustment mechanism 112, and is displaced to be posterior to the reference anteroposterior position. In addition, the second holding surface 120 protrudes toward the first holding surface 116 side more than the reference radius direction position, by the function of the radius position adjustment mechanism 114. The second holding head 106 enters the delivery position IV in this state. The delivery point 124 is thereby formed at a moving direction front end of the first holding surface 116 and the second holding surface 120. The delivery point 124 is positioned on the straight line L connecting the rotational center C1 and the rotational center C2. The first holding heads 102 deliver the sheet materials W to the second holding heads 106 in order from portions of the sheet materials W that have passed through the delivery point 124.

During the progress of the first holding head 102 and the second holding head 106, the tilt adjustment mechanism 110 gradually decreases the tilt of the second holding surface 120 to bring a tilt angle closer to a reference tilt angle. In addition, the speed adjustment mechanism 112 accelerates the second holding surface 120 in the traveling direction, and maintains a relative movement speed of the first holding surface 116 and the second holding surface 120 at the delivery point 124 at substantially zero. In addition, the radius position adjustment mechanism 114 gradually separates the second holding surface 120 from the first holding surface 116, and brings closer to the reference radius direction position. The delivery point 124 thereby reaches an intermediate position of the first holding surface 116 and the second holding surface 120 while maintaining a state of being positioned on the straight line L as illustrated in FIG. 4B. In this state, the second holding surface 120 takes the reference tilt angle, the reference anteroposterior position, and the reference radius direction position. Accordingly, the second holding surface 120 is vertical to the straight line L.

If the first holding head 102 and the second holding head 106 further progress, the tilt adjustment mechanism 110 gradually retroverts the second holding surface 120 from the reference tilt angle. In addition, the speed adjustment mechanism 112 maintains a state in which the second holding surface 120 is accelerated, and maintains a relative movement speed of the first holding surface 116 and the second holding surface 120 at the delivery point 124 at substantially zero. In addition, the radius position adjustment mechanism 114 gradually brings the second holding surface 120 closer to the first holding surface 116 from the reference radius direction position. The delivery point 124 thereby reaches a moving direction back end of the first holding surface 116 and the second holding surface 120 while maintaining a state of being positioned on the straight line L as illustrated in FIG. 4C. By the above-described operation, delivery of the sheet material W from the first holding surface 116 to the second holding surface 120 is completed.

As illustrated in FIG. 2, the second holding head 106 that has received the sheet material W moves to a circumferential position V on the second drum 108 by the rotation of the second drum 108. A camera 162 is arranged at the circumferential position V. A state of the sheet material W and a position on the second holding surface 120 of the sheet material W are detected by the camera 162.

Then, the second holding heads 106 sequentially move to a lamination position VI facing the lamination stage 30, by the rotation of the second drum 108, discharge the held sheet materials W onto the lamination stage 30, and laminate the plurality of sheet materials W. When the sheet materials W are discharged onto the lamination stage 30 from the second holding heads 106, the lamination stage 30 adjusts an X-axis direction position, a Y-axis direction position, and a tilt angle of the stage in accordance with a detection result of the camera 162. By this adjustment, the sheet materials W can be laminated highly accurately.

Each of the second holding heads 106 of the present embodiment discharges the sheet material W by bringing the second holding surface 120 closer to the lamination stage 30 at the lamination position VI. The displacement of the second holding surface 120 can be implemented by the radius position adjustment mechanism 114. In addition, the second holding head 106 is displaced backward in the moving direction at the lamination position VI in such a manner as to cancel out movement of the second holding surface 120 that is caused by the rotation of the second drum 108. The sheet materials W can be thereby laminated onto the lamination stage 30 in a state in which the second holding surface 120 is apparently at a stop in the circumferential direction of the second drum 108. The displacement of the second holding head 106 can be implemented by the speed adjustment mechanism 112.

Note that curve shapes of the respective cams included in the tilt adjustment mechanism 110, the speed adjustment mechanism 112, and the radius position adjustment mechanism 114 can be appropriately set in accordance with the position and the orientation of the second holding surface 120 on the basis of geometric calculation, simulation, and the like that are performed by a designer.

In the above description, the sheet material W is delivered from the first holding surface 116 having a curved surface shape to the second holding surface 120 having a planar shape, but the delivery of the sheet material W may be performed in a reverse order. In addition, in the above description, the speed adjustment mechanism 112 adjusts a relative movement speed of the first holding head 102 and the second holding head 106 by displacing the second holding head 106 forward and backward in the rotational direction with respect to the rotation of the second drum 108, but the configuration is not limited to this configuration. For example, the speed adjustment mechanism 112 may adjust a relative movement speed of the first holding head 102 and the second holding head 106 by displacing the first holding head 102 forward and backward in the rotational direction with respect to the rotation of the first drum 104. In this case, the speed adjustment mechanism 112 can be formed by the drive units 118 of the respective first holding heads 102. In other words, the speed adjustment mechanism 112 can adjust the relative movement speed by displacing each of the first holding surfaces 116 forward and backward in the rotational direction with respect to the rotation of the first drum 104, or displacing each of the second holding surfaces 120 forward and backward in the rotational direction with respect to the rotation of the second drum 108, or by displacing both of them.

In addition, in the above description, the separator cutoff drum 12 and the first drum 104 are associated with each other, but the configuration is not limited to this configuration. For example, in a case where a drum that receives a unit laminated member from the separator cutoff drum 12 and delivers the unit laminated member to the lamination drum 14 is interposed between the separator cutoff drum 12 and the lamination drum 14, the first drum 104 may correspond to this drum. In addition, the second drum 108 is not limited to the lamination drum 14, and the sheet material W held by the second holding head 106 may be delivered to a mechanism other than the lamination stage 30. In addition, the sheet material W is not limited to a unit laminated member in which electrode plates and separators are laminated, and may be a unit laminated member including only electrode members or only separators, or may be a member other than components of a battery. In other words, the sheet material conveyance device 100 can be applied not only to manufacturing of a laminated electrode member and a battery that uses the laminated electrode member, but also to manufacturing of a film material including a capacitor, a flexible substrate, and the like, and a product that uses the film material.

As described above, the sheet material conveyance device 100 according to the present embodiment includes the plurality of first holding heads 102, the first drum 104, the plurality of second holding heads 106, the second drum 108, the tilt adjustment mechanism 110, the speed adjustment mechanism 112, and the radius position adjustment mechanism 114.

The plurality of first holding heads 102 each has the curved first holding surface 116 for holding the sheet material W. The first drum 104 holds the plurality of first holding heads 102 at predetermined intervals in the circumferential direction in such a manner that the first holding surfaces 116 face the external side, and rotates in the first direction D1 to revolve the plurality of first holding heads 102. The plurality of second holding heads 106 each has the planar second holding surface 120 for holding the sheet material W. The second drum 108 holds the plurality of second holding heads 106 at predetermined intervals in the circumferential direction in such a manner that the second holding surfaces 120 face the external side, and rotates in the second direction D2 opposite to the first direction D1 to revolve the plurality of second holding heads 106.

The tilt adjustment mechanism 110 adjusts a tilt of the second holding surface 120 with respect to the radius direction R of the second drum 108. The speed adjustment mechanism 112 adjusts a relative movement speed of one set of the first holding head 102 and the second holding head 106 that exchange the sheet material W. The radius position adjustment mechanism 114 adjusts a position of each of the second holding surfaces 120 in the radius direction R of the second drum 108.

The first holding head 102 and the second holding head 106, one of which holds the sheet material W and the other one of which does not hold the sheet material W, move to the delivery position IV at which the first holding surface 116 and the second holding surface 120 face each other, by the rotation of the respective drums, and deliver the sheet material W between the first holding surface 116 and the second holding surface 120 in a situation in which a tilt of the second holding surface 120, a relative movement speed of the first holding head 102 and the second holding head 106, and a radius direction position of the second holding surface 120 are adjusted by the tilt adjustment mechanism 110, the speed adjustment mechanism 112, and the radius position adjustment mechanism 114.

When the sheet material W is exchanged between the first holding surface 116 having a curved surface shape and the second holding surface 120 having a planar shape, load such as shear force might be applied to the sheet material W due to a change in relative positions or relative speed of the first holding surface 116 and the second holding surface 120 at the delivery point 124, or the like. In consideration of this, by delivering the sheet material W while adjusting states of the first holding surface 116 and the second holding surface 120 by the tilt adjustment mechanism 110, the speed adjustment mechanism 112, and the radius position adjustment mechanism 114, it is possible to prevent an interval between the first holding surface 116 and the second holding surface 120 at the delivery point 124, from varying during the delivery of the sheet material W. For example, it is possible to suppress a relative displacement amount of two holding surfaces to 0.5 mm or less, and further suppress the relative displacement amount to 0. In addition, a relative movement speed of the first holding surface 116 and the second holding surface 120 at the delivery point 124 can be stabilized. It is accordingly possible to reduce load to be applied to the sheet material W at the time of delivery. In addition, it is possible to prevent a crease from being generated in the sheet material W on the second holding surface 120, or prevent a delivery position from being shifted from a targeted delivery position.

In addition, according to the sheet material conveyance device 100 of the present embodiment, because the sheet material W can be delivered in a state of being individuated, it is possible to enhance a design freedom degree of a process following the conveyance of the sheet material W that is performed by the second drum 108. Furthermore, because the sheet material W can be delivered while moving the first holding surface 116 and the second holding surface 120, throughput of the sheet material conveyance device 100 can be enhanced.

In addition, the tilt adjustment mechanism 110, the speed adjustment mechanism 112, and the radius position adjustment mechanism 114 of the present embodiment adjust a tilt of the second holding surface 120, a relative movement speed of the first holding head 102 and the second holding head 106, and a radius direction position of the second holding surface 120 in such a manner that a position of the delivery point 124 is fixed with respect to the rotational center C1 of the first drum 104 and the rotational center C2 of the second drum 108, and a relative movement speed of the first holding head 102 and the second holding head 106 at the delivery point 124 gets closer to zero.

In a case where the delivery point 124 moves with respect to the first drum 104 and the second drum 108 during the delivery of the sheet material W, if relative positions of the first drum 104 and the second drum 108 are shifted from designed positions, relative positions and relative speed of the first holding surface 116 and the second holding surface 120 change in accordance with the position of the delivery point 124, and load can be applied to the sheet material W. It therefore becomes necessary to adjust positions of the first drum 104 and the second drum 108 highly accurately. In contrast to this, because the delivery point 124 is fixed with respect to the first drum 104 and the second drum 108 in the present embodiment, it is possible to enhance a freedom degree of a relative positional relationship between the first drum 104 and the second drum 108. Accordingly, an assembly work of the sheet material conveyance device 100 becomes easier, and a design freedom degree of the sheet material conveyance device 100 can be enhanced.

In addition, the second holding heads 106 of the present embodiment sequentially move to the lamination position VI facing the lamination stage 30, by the rotation of the second drum 108, discharge the held sheet materials W onto the lamination stage 30, and laminate the plurality of sheet materials W. In addition, as an example, the sheet material W is a unit laminated member including electrode plates of a battery. It is therefore possible to improve a production lead time and throughput of a battery. In addition, each of the second holding heads 106 of the present embodiment brings the second holding surface 120 closer to the lamination stage 30 at the lamination position VI. The structure of the sheet material conveyance device 100 can be thereby simplified as compared with a case where the second holding surface 120 is fixed and the lamination stage 30 is brought closer to the second holding surface 120.

Second Embodiment

The second embodiment has configurations approximately similar to the first embodiment except that the radius position adjustment mechanism 114 is not included. Hereinafter, configurations of the present embodiment that are different from the first embodiment will be mainly described, and similar configurations will be briefly described or the description will be omitted.

Figure 5:
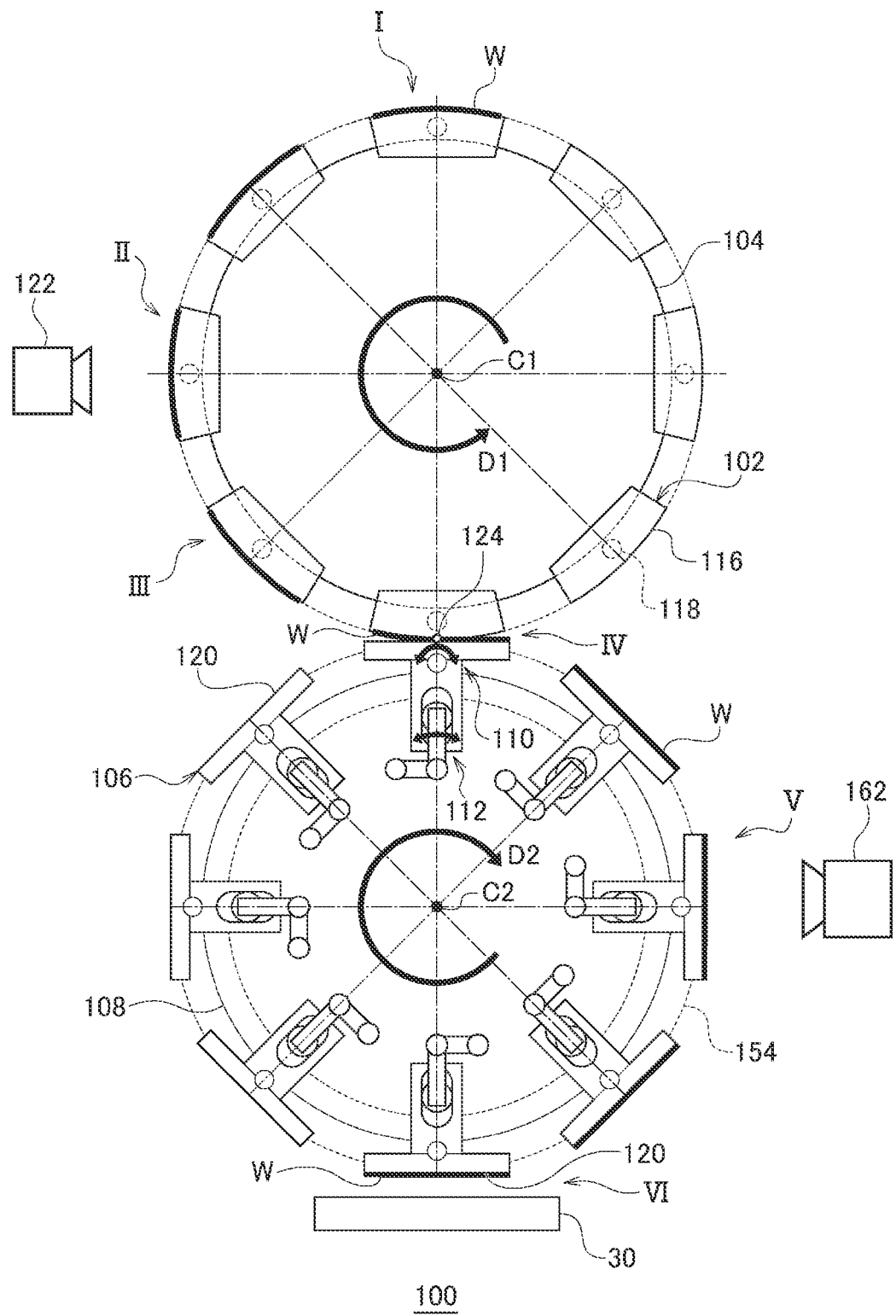
FIG. 5 is a schematic diagram of a sheet material conveyance device according to a second embodiment.

FIG. 5 is a schematic diagram of a sheet material conveyance device 100 according to the second embodiment. Note that, in FIG. 5, illustration of each cam and a guide rail 158 provided on a fixed plate 154 is omitted. The sheet material conveyance device 100 includes a plurality of first holding heads 102, a first drum 104, a plurality of second holding heads 106, a second drum 108, a tilt adjustment mechanism 110, and a speed adjustment mechanism 112.

Each of the first holding heads 102 has a first holding surface 116 having a curved surface shape. The plurality of first holding heads 102 is held by the first drum 104. The first drum 104 holds the plurality of first holding heads 102 at predetermined intervals in the circumferential direction in such a manner that the first holding surfaces 116 face an external side of the cylinder. The first drum 104 rotates about a rotational center C1 in a first direction D1 to revolve the plurality of first holding heads 102. Each of the first holding heads 102 includes a drive unit 118, and can move in the circumferential direction of the first drum 104 independently of other first holding heads 102.

Each of the second holding heads 106 has a second holding surface 120 having a planar shape. The plurality of second holding heads 106 is held by the second drum 108. The second drum 108 holds the plurality of second holding heads 106 at predetermined intervals in the circumferential direction in such a manner that the second holding surfaces 120 face an external side of the cylinder. The second drum 108 rotates about a rotational center C2 in the second direction D2 to revolve the plurality of second holding heads 106. The second drum 108 is arranged in proximity to the first drum 104, and a delivery position IV at which the first holding surface 116 and the second holding surface 120 face each other is formed. The first holding heads 102 holding the sheet materials W, and the second holding heads 106 not holding the sheet material W sequentially move to the delivery position IV by the rotation of each drum.

Figure 6:
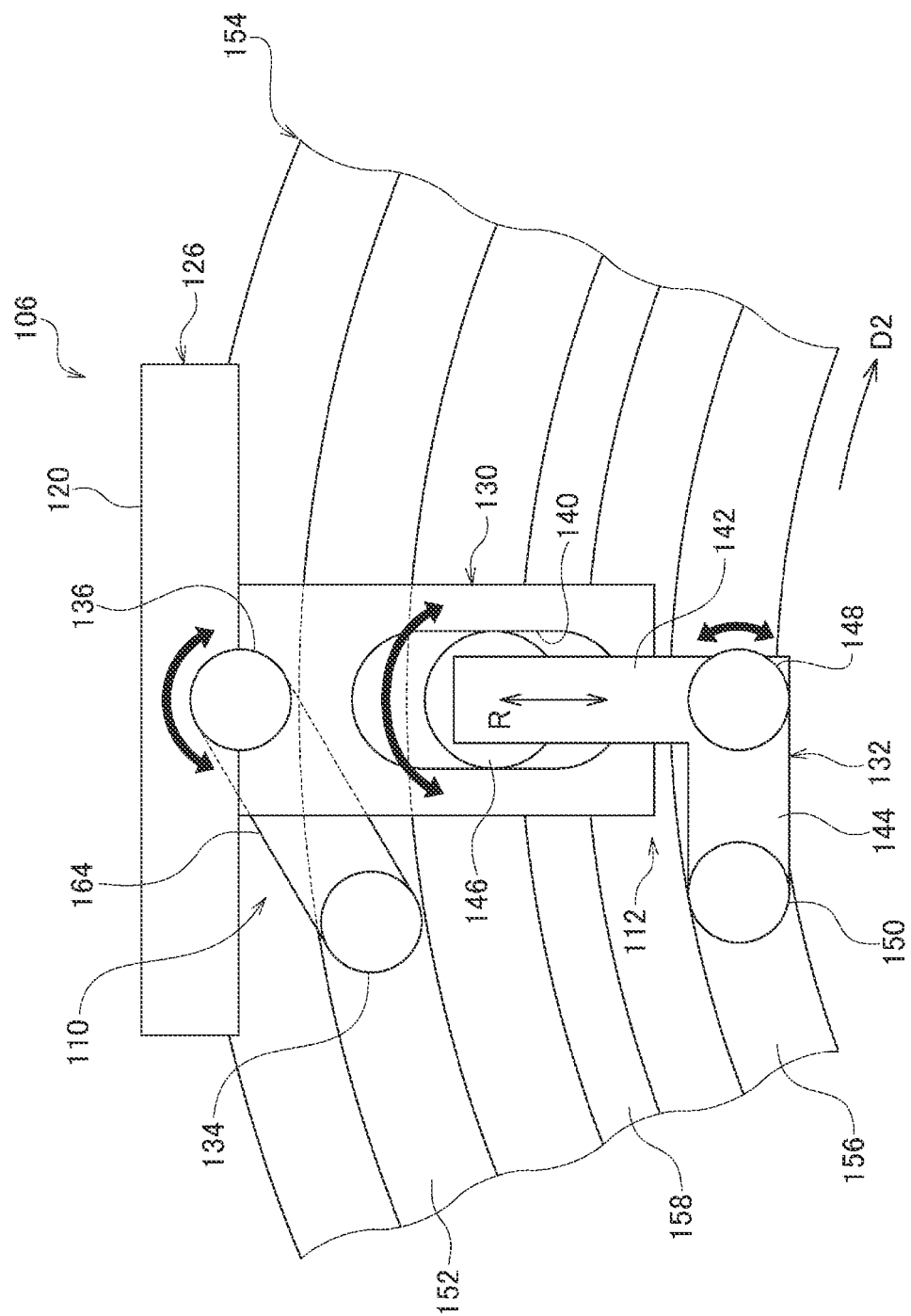
FIG. 6 is a schematic diagram of a second holding head, a tilt adjustment mechanism, and a speed adjustment mechanism.

A delivery point 124 of the sheet material W is formed in portions most proximate to each other on the first holding surface 116 and the second holding surface 120 facing each other. The delivery point 124 moves on each holding surface along with the progress of each head. In a case where the sheet material W is delivered from the first holding surface 116 to the second holding surface 120 while maintaining the rotation of the first drum 104 and the second drum 108, load such as shear force might be applied to the sheet material W. In consideration of this, the sheet material conveyance device 100 of the present embodiment reduces load to be applied to the sheet material W, using the tilt adjustment mechanism 110 and the speed adjustment mechanism 112. FIG. 6 is a schematic diagram of the second holding head 106, the tilt adjustment mechanism 110, and the speed adjustment mechanism 112.

The second holding head 106 includes a head portion 126, a base plate 130, and a link portion 132. The head portion 126 has a substantially flat plate shape, and a principal surface facing a radius direction R external side of the second drum 108 forms the second holding surface 120. A pivot shaft 136 is provided on a principal surface of the head portion 126 that faces the radius direction R internal side, and the head portion 126 is coupled to the base plate 130 via the pivot shaft 136. The head portion 126 is fixed to the pivot shaft 136, and the base plate 130 slidably holds the pivot shaft 136. In addition, one end of an arm portion 164 having a substantially stick shape is connected to the pivot shaft 136. A first cam follower 134 is provided at another end of the arm portion 164. If the arm portion 164 rotates, the pivot shaft 136 and the head portion 126 rotate in accordance with the rotation. A tilt of the second holding surface 120 with respect to the radius direction R can be thereby changed.

The base plate 130 includes an elongate hole 140 extending approximately in the radius direction R. The link portion 132 is a member having a substantially L shape, and includes a first portion 142 extending approximately in the radius direction R, and a second portion 144 extending substantially orthogonally from an end portion of the first portion 142 on the radius direction R internal side. An end portion of the first portion 142 on the radius direction R external side is coupled to the elongate hole 140 via a third cam follower 146. With this configuration, a displacement in the radius direction R of the third cam follower 146 that is caused by the link portion 132 rotating about a link shaft 148 can be allowed by an amount corresponding to the length of the elongate hole 140.

The link shaft 148 is provided at an intersection point (corner portion of an L shape) of the first portion 142 and the second portion 144. The link shaft 148 is coupled to the second drum 108, and follows the rotation of the second drum 108. The link portion 132, the base plate 130, and the head portion 126 are coupled to the second drum 108 via the link shaft 148. Accordingly, by the link shaft 148 following the rotation of the second drum 108, the link portion 132, the base plate 130, and the head portion 126 move in the circumferential direction of the second drum 108 in synchronization with the rotation. A fourth cam follower 150 is provided at a leading end of the second portion 144.

The tilt adjustment mechanism 110 is a mechanism that adjusts a tilt of the second holding surface 120 with respect to the radius direction R of the second drum 108. The tilt adjustment mechanism 110 is formed by a cam mechanism including a first cam 152 and the first cam follower 134. The fixed plate 154 that has a circular shape and does not follow the rotation of the second drum 108 is provided on the second drum 108. The first cam 152 is provided on the fixed plate 154. The fixed plate 154 is arranged in such a manner that its center overlaps the rotational center C2 of the second drum 108. The first cam 152 extends in the circumferential direction of the fixed plate 154. As an example, the first cam 152 is a groove cam provided on the principal surface of the fixed plate 154. The first cam follower 134 slidably contacts the first cam 152, and moves along the first cam 152 in accordance with the rotation of the second drum 108.

The first cam 152 has a shape that is based on a concentric circle with the second drum 108. Nevertheless, a portion of the first cam 152 that extends in a region including the delivery position IV is shifted with respect to a basic circle in such a manner that the tilt of the second holding surface 120 changes. The region including the delivery position IV includes, for example, a predetermined region contacting the delivery position IV on a moving direction backward side of the second holding head 106, and the delivery position IV.

For example, in a case where the first cam 152 is curved in a direction getting away from a circle center with respect to the basic circle, the first cam follower 134 passing through this portion is displaced toward the radius direction R external side of the second drum 108. The arm portion 164 thereby rotates in the second direction D2. By the rotation of the arm portion 164, the pivot shaft 136 and the head portion 126 rotate in the second direction D2. Consequently, a front end side of the second holding surface 120 in the traveling direction of the second holding head 106 is displaced toward the radius direction R internal side. On the other hand, in a case where the first cam 152 is curved in a direction getting closer to a circle center with respect to the basic circle, the first cam follower 134 passing through this portion is displaced toward the radius direction R internal side of the second drum 108. The arm portion 164 thereby rotates in an opposite direction of the second direction D2. By the rotation of the arm portion 164, the pivot shaft 136 and the head portion 126 rotate in the opposite direction of the second direction D2. Consequently, a front end side of the second holding surface 120 in the traveling direction of the second holding head 106 is displaced toward the radius direction R external side.

The speed adjustment mechanism 112 is a mechanism that adjusts a relative movement speed of one set of the first holding head 102 and the second holding head 106 that exchange the sheet material W. The speed adjustment mechanism 112 of the present embodiment sets a moving speed of the first holding heads 102 to a constant speed over the entire circumference of the first drum 104. On the other hand, moving speeds of the second holding heads 106 in the predetermined region contacting the delivery position IV on the moving direction backward side, and at the delivery position IV are differentiated from a moving speed in other regions. At the delivery position IV, a relative movement speed of the first holding head 102 and the second holding head 106 is thereby adjusted.

The speed adjustment mechanism 112 of the present embodiment is formed by a cam mechanism including a second cam 156 and the fourth cam follower 150. The second cam 156 is provided on the fixed plate 154. The second cam 156 extends in the circumferential direction of the fixed plate 154. As an example, the second cam 156 is a groove cam provided on a principal surface of the fixed plate 154. The fourth cam follower 150 slidably contacts the second cam 156, and moves along the second cam 156 in accordance with the rotation of the second drum 108.

The second cam 156 has a shape that is based on a concentric circle with the second drum 108. Nevertheless, a portion of the second cam 156 that extends in the region including the delivery position IV is shifted with respect to a basic circle in such a manner that a relative movement speed of the first holding head 102 and the second holding head 106 is adjusted.

For example, in a case where the second cam 156 is curved in a direction getting away from a circle center with respect to the basic circle, the fourth cam follower 150 passing through this portion is displaced toward the radius direction R external side of the second drum 108. The link portion 132 thereby rotates about the link shaft 148 in the second direction D2, and the third cam follower 146 is displaced in the moving direction of the second holding head 106. The base plate 130 is slidably fitted in the guide rail 158 provided on the fixed plate 154. The guide rail 158 has a shape that is based on a concentric circle with the second drum 108. Thus, the base plate 130 slides on the guide rail 158 in the moving direction of the second holding head 106 in accordance with the displacement of the third cam follower 146. A moving speed of the second holding head 106 thereby increases.

On the other hand, in a case where the second cam 156 is curved in a direction getting closer to a circle center with respect to the basic circle, the fourth cam follower 150 passing through this portion is displaced toward the radius direction R internal side of the second drum 108. The link portion 132 thereby rotates about the link shaft 148 in the opposite direction of the second direction D2, and the third cam follower 146 is displaced in the opposite direction of the moving direction of the second holding head 106. The base plate 130 slides on the guide rail 158 in the opposite direction of the moving direction of the second holding head 106 in accordance with the displacement of the third cam follower 146. A moving speed of the second holding head 106 thereby decreases.

The first holding head 102 and the second holding head 106 that have reached the delivery position IV deliver the sheet material W from the first holding surface 116 to the second holding surface 120 in a situation in which a tilt of the second holding surface 120 and a relative movement speed of the first holding surface 116 and the second holding surface 120 are adjusted by the tilt adjustment mechanism 110 and the speed adjustment mechanism 112.

Figure 7A:
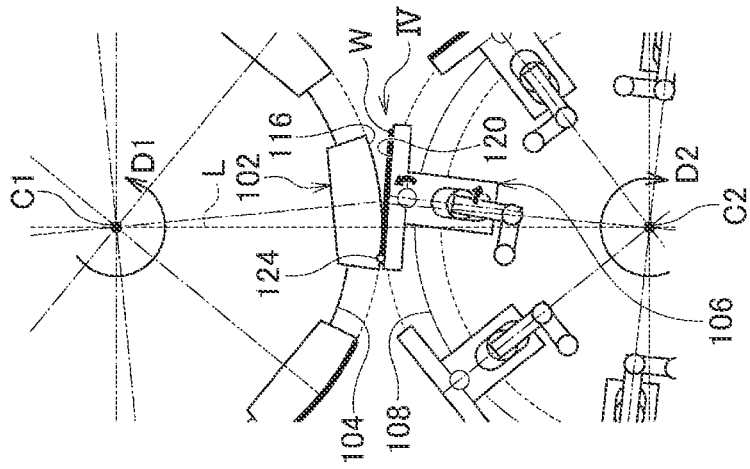
FIGS. 7A-7C are schematic diagrams for describing an operation of a sheet material conveyance device.
Figure 7B:
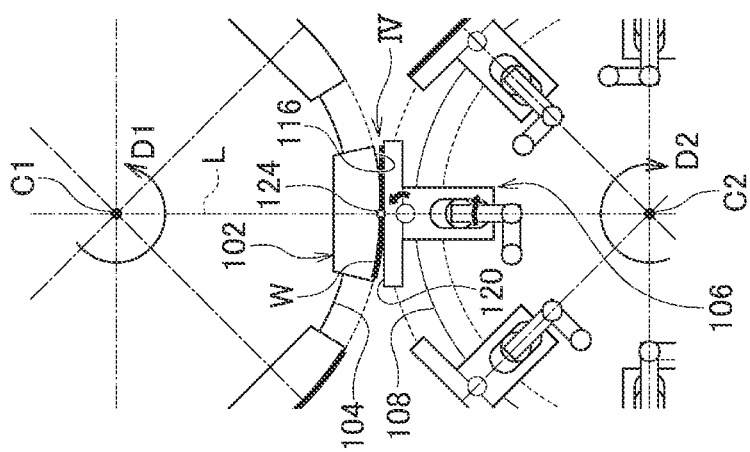
Figure 7C:
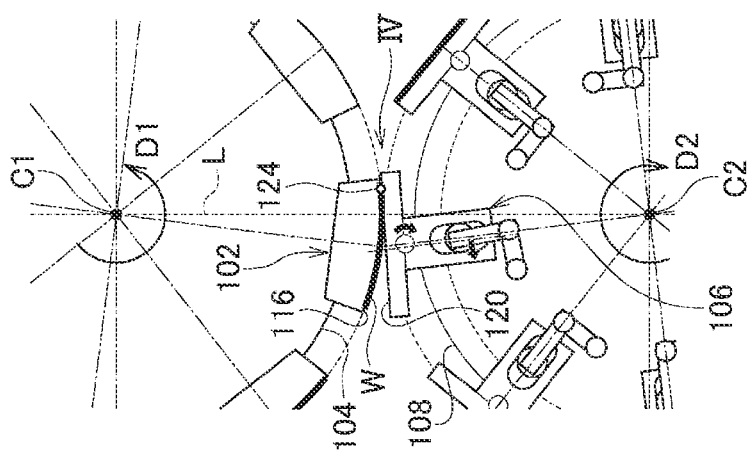

FIGS. 7A to 7C are schematic diagrams for describing an operation of the sheet material conveyance device 100. Note that, in FIGS. 7A to 7C, illustration of each cam and the guide rail 158 is omitted. The tilt adjustment mechanism 110 and the speed adjustment mechanism 112 of the present embodiment adjust a tilt of the second holding surface 120 and a relative movement speed of the first holding surface 116 and the second holding surface 120 in such a manner that the delivery point 124 moves parallel to the first holding surface 116, and a relative movement speed of the first holding head 102 and the second holding head 106 at the delivery point 124 gets closer to zero.

Specifically, by cooperation between the tilt adjustment mechanism 110 and the speed adjustment mechanism 112, the second holding surface 120 swings in such a manner as to form an arc along the curved surface of the first holding surface 116. In other words, the second holding surface 120 changes in tilt angle in such a manner as to roll on the surface of the first holding surface 116. The delivery point 124 thereby moves parallel to the curved surface of the first holding surface 116. In addition, a relative movement speed of the first holding surface 116 and the second holding surface 120 at the delivery point 124 is brought closer to zero. As an example, the relative movement speed is set to substantially zero until the delivery of the sheet material W is completed.

First of all, as illustrated in FIG. 7A, the second holding surface 120 is anteverted to be anterior to the reference tilt orientation, by the function of the tilt adjustment mechanism 110. In addition, the second holding surface 120 is decelerated to a moving speed lower than the reference moving speed, by the function of the speed adjustment mechanism 112, and is displaced to be posterior to the reference anteroposterior position. The second holding head 106 enters the delivery position IV in this state. The delivery point 124 is thereby formed at a moving direction front end of the first holding surface 116 and the second holding surface 120. The delivery point 124 is positioned anterior in the moving direction of the first holding surface 116 and the second holding surface 120 to the straight line L connecting the rotational center C1 and the rotational center C2. The first holding heads 102 deliver the sheet materials W to the second holding heads 106 in order from portions of the sheet materials W that have passed through the delivery point 124.

During the progress of the first holding head 102 and the second holding head 106, the tilt adjustment mechanism 110 gradually decreases the tilt of the second holding surface 120 to bring a tilt angle closer to a reference tilt angle. In addition, the speed adjustment mechanism 112 accelerates the second holding surface 120 in the traveling direction, and maintains a relative movement speed of the first holding surface 116 and the second holding surface 120 at the delivery point 124 at substantially zero. The delivery point 124 thereby reaches an intermediate position of the first holding surface 116 and the second holding surface 120 while moving parallel to the first holding surface 116 as illustrated in FIG. 7B. In this state, the second holding surface 120 takes the reference tilt angle and the reference anteroposterior position. Accordingly, the second holding surface 120 is vertical to the straight line L. In addition, the delivery point 124 is positioned on the straight line L.

If the first holding head 102 and the second holding head 106 further progress, the tilt adjustment mechanism 110 gradually retroverts the second holding surface 120 from the reference tilt angle. In addition, the speed adjustment mechanism 112 maintains a state in which the second holding surface 120 is accelerated, and maintains a relative movement speed of the first holding surface 116 and the second holding surface 120 at the delivery point 124 at substantially zero. The delivery point 124 thereby reaches a moving direction back end of the first holding surface 116 and the second holding surface 120 while moving parallel to the first holding surface 116 as illustrated in FIG. 7C. The delivery point 124 is positioned posterior to the straight line L in the moving direction of the first holding surface 116 and the second holding surface 120. By the above-described operation, delivery of the sheet material W from the first holding surface 116 to the second holding surface 120 is completed.

As illustrated in FIG. 5, the second holding head 106 that has received the sheet material W moves to a circumferential position V on the second drum 108 by the rotation of the second drum 108, and a state and a position on the second holding surface 120 of the sheet material W are detected by the camera 162. Then, the second holding heads 106 sequentially move to a lamination position VI facing the lamination stage 30, by the rotation of the second drum 108, discharge the held sheet materials W onto the lamination stage 30, and laminate the plurality of sheet materials W.

Each of the second holding heads 106 of the present embodiment discharges the sheet material W by bringing the second holding surface 120 closer to the lamination stage 30 at the lamination position VI. The displacement of the second holding surface 120 can be implemented by providing the radius position adjustment mechanism 114 that displaces the second holding surface 120 in the radius direction R of the second drum 108 only at the lamination position VI. In addition, the second holding head 106 is displaced backward in the moving direction at the lamination position VI in such a manner as to cancel out movement of the second holding surface 120 that is caused by the rotation of the second drum 108. The displacement of the second holding head 106 can be implemented by the speed adjustment mechanism 112.

Similarly to the first embodiment, curve shapes of the respective cams included in the tilt adjustment mechanism 110 and the speed adjustment mechanism 112 can be appropriately set on the basis of geometric calculation, simulation, and the like that are performed by a designer. In addition, the sheet material W may be delivered from the second holding surface 120 having a planar shape to the first holding surface 116 having a curved surface shape. In addition, the speed adjustment mechanism 112 may adjust a relative movement speed of the first holding head 102 and the second holding head 106 by displacing the first holding head 102 forward and backward in the rotational direction with respect to the rotation of the first drum 104. In addition, the first drum 104 is not limited to the separator cutoff drum 12, and the second drum 108 is not limited to the lamination drum 14. In addition, the sheet material W is not limited to a unit laminated member.

In the sheet material conveyance device 100 according to the present embodiment, a tilt of the second holding surface 120 and a relative movement speed of the first holding head 102 and the second holding head 106 are adjusted by the tilt adjustment mechanism 110 and the speed adjustment mechanism 112 in such a manner that the delivery point 124 moves parallel to the first holding surface 116, and a relative movement speed of the first holding head 102 and the second holding head 106 at the delivery point 124 gets closer to zero. With such a configuration, load to be applied to the sheet material W when the sheet material W is delivered from a curved surface to a planar surface can be reduced as well. In addition, similarly to the first embodiment, it is possible to enhance a design freedom degree of a process following the conveyance of the sheet material W that is performed by the second drum 108, and enhance throughput of the sheet material conveyance device 100.

In other words, if at least the tilt adjustment mechanism 110 and the speed adjustment mechanism 112 are provided, load to be applied to the sheet material W when the sheet material W is delivered from a curved surface to a planar surface can be reduced. On the other hand, because the radius position adjustment mechanism 114 is not provided in the present embodiment, the position of the delivery point 124 cannot be fixed with respect to the first drum 104 and the second drum 108. In this case, required positional accuracy of the first drum 104 and the second drum 108 becomes higher. Nevertheless, because a movable portion of the second holding head 106 decreases by an amount corresponding to the radius position adjustment mechanism 114, it is possible to reduce the number of components included in the second holding head 106. Accordingly, it is possible to enhance rigidity of the second holding head 106, and higher-speed operations of the sheet material conveyance device 100 can be achieved more easily.

Heretofore, the embodiments of the present disclosure have been described. The above-described embodiments merely indicate specific examples in implementing the present disclosure. The content of the embodiments is not intended to limit the technical scope of the present disclosure, and many design changes such as changes, addition, and deletion of constituent elements can be made without departing from the idea of the present disclosure set forth in the appended claims. A new embodiment to which design changes have been added has both effects of a combined embodiment and it modification. In the above-described embodiments, content on which such design changes can be made is emphasized by adding a wording such as "of the present embodiment" or "in the present embodiment", but design changes are allowed also for content without such a wording. An arbitrary combination of the above constituent elements is also effective as an aspect of the present disclosure. Hatching added to a cross section in the drawings is not intended to limit the material of a hatched portion.

What is claimed is:

1. A sheet material conveyance device comprising:
   a plurality of first holding heads each having a curved first holding surface for holding a sheet material;
   a first drum structured to hold the plurality of first holding heads at predetermined intervals in a circumferential direction in such a manner that each first holding surface faces an external side, and rotate in a first direction to revolve the plurality of first holding heads;
   a plurality of second holding heads each having a planar second holding surface for holding the sheet material;
   a second drum structured to hold the plurality of second holding heads at predetermined intervals in a circumferential direction in such a manner that each second holding surface faces an external side, and rotate in a second direction opposite to the first direction to revolve the plurality of second holding heads;
   a tilt adjustment mechanism structured to adjust a tilt of the second holding surface with respect to a radius direction of the second drum; and
   a speed adjustment mechanism structured to adjust a relative movement speed of one set of the first holding head and the second holding head that perform exchange of the sheet material,
   wherein the first holding head and the second holding head, one of which holds the sheet material, and another one of which does not hold the sheet material, move to a delivery position at which the first holding surface and the second holding surface face each other, by rotation of respective drums, and deliver the sheet material between the first holding surface and the second holding surface in a situation in which the tilt and the relative movement speed are adjusted by the tilt adjustment mechanism and the speed adjustment mechanism.

2. The sheet material conveyance device according to claim 1,
   wherein, on the first holding surface and the second holding surface facing each other, a delivery point of the sheet material is formed at positions most proximate to each other, and
   the tilt adjustment mechanism and the speed adjustment mechanism adjust the tilt and the relative movement speed in such a manner that the delivery point moves parallel to the first holding surface, and the relative movement speed at the delivery point gets closer to zero.

3. The sheet material conveyance device according to claim 1, comprising
   a radius position adjustment mechanism structured to adjust a position of each second holding surface in a radius direction of the second drum.

4. The sheet material conveyance device according to claim 3,
   wherein, on the first holding surface and the second holding surface facing each other, a delivery point of the sheet material is formed at positions most proximate to each other, and
   the tilt adjustment mechanism, the speed adjustment mechanism, and the radius position adjustment mechanism adjust the tilt, the relative movement speed, and a radius direction position of the second holding surface in such a manner that a position of the delivery point is fixed with respect to a rotational center of each drum, and the relative movement speed at the delivery point gets closer to zero.

5. The sheet material conveyance device according to claim 1,
   wherein each second holding head receives the sheet material from each first holding head, sequentially moves to a lamination position facing a lamination stage, by rotation of the second drum, discharges the held sheet material onto the lamination stage, and laminates a plurality of sheet materials.

6. The sheet material conveyance device according to claim 5,
   wherein each second holding head brings the second holding surface closer to the lamination stage at the lamination position.

7. The sheet material conveyance device according to claim 1,
   wherein the sheet material includes at least one of an electrode plate and a separator of a battery.

* * * * *